United States Patent [19]

Inokuchi

[11] 4,204,729
[45] May 27, 1980

[54] TRANSMITTING AND COPYING MACHINE
[75] Inventor: Toshiyuki Inokuchi, Yokohama, Japan
[73] Assignee: Ricoh Company, Tokyo, Japan
[21] Appl. No.: 16,520
[22] Filed: Feb. 28, 1979
[30] Foreign Application Priority Data
  Mar. 20, 1978 [JP] Japan .................... 53-32174
[51] Int. Cl.² ............... G03G 15/28; G03B 27/70
[52] U.S. Cl. .............................. 355/11; 355/66
[58] Field of Search ................... 355/46–51, 355/57, 60, 66, 8, 11

[56] References Cited
U.S. PATENT DOCUMENTS

| | | | |
|---|---|---|---|
| 3,051,041 | 8/1962 | Lehmann et al. ............. | 355/11 X |
| 3,681,527 | 8/1972 | Nishiyama et al. ........... | 355/8 X |
| 4,005,933 | 2/1977 | De Loye et al. .............. | 355/66 |
| 4,015,892 | 4/1977 | Tabata ............................ | 355/66 X |

OTHER PUBLICATIONS

I.B.M. Technical Disclosure Bulletin, vol. 15, No. 12, May, 1973 pp. 3647-3648, Mix, Two-Dimensional Diode Array Scanner for Reproduction Apparatus.

*Primary Examiner*—Donald A. Griffin
*Attorney, Agent, or Firm*—Oblon, Fisher, Spivak, McClelland & Maier

[57] ABSTRACT

A transmitting and copying machine comprising an optical system on the copying side having an image forming lens for guiding original-scanning reflected light onto a photosensitive material to form an image thereon, an optical system on the transmitting side having an optical axis biased in a main scanning direction, and a fixed mirror for refracting the optical axis of the optical system on the transmitting side such that the optical axis passes in front of the image forming lens to be guided onto the solid scanning element via the reading lens. The reading lens has a small maximum half image angle and the fixed mirror has a small reflecting surface. Then, the optical system on the transmitting side can be inserted very easily in the machine.

7 Claims, 16 Drawing Figures

TRANSMITTING AND COPYING MACHINE

Description of the Invention:

The present invention relates to a transmitting and copying machine having a function of transmitting to a distance an image of an original converted into electric signals, and a function of copying such an image.

An object of the present invention is to provide a copying machine of an ordinary construction to which a function of transmitting an image of an original to a distance is added.

Another object of the present invention is to minimize a maximum half image angle of a reading lens in an optical system on the transmitting side.

Still another object of the present invention is to minimize the reflecting surface of a fixed mirror whereby the optical axis of the optical system on the transmitting side is bent.

A further object of the present invention is to eliminate troubles due to stray light in an optical system on the copying side and optical system on the transmitting side.

Other objects of the present invention will become clear from the following description of the invention with reference to the accompanying drawings.

FIG. 8a illustrates an optical system in the embodiment of the present invention shown in FIG. 5.

FIG. 8b illustrates an optical system in a conventional transmitting and copy machine.

FIG. 8c illustrates an optical system in another embodiment of the present invention.

Figure 1:
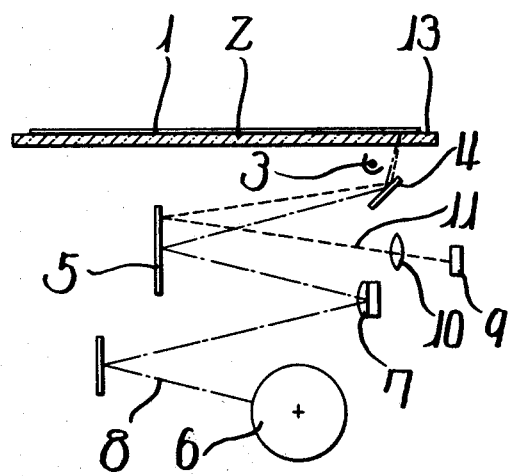
FIG. 1 is a front elevational view in longitudinal cross section of a conventional transmitting and copying machine.

In order to simultaneously effect the transmitting of an image of an original and the copying of the same in a conventional transmitting and copying machine of this kind, an optical system on the transmitting side and an optical system on the copying side had to be separately formed. Conventional transmitting and copying machines of this kind include a one as shown in FIG. 1 in which such optical systems have a part in common. In this transmitting and copying machine, a light source 3 and a first mirror 4 whereby the light reflected on an original 1 is refracted are disposed under a table 2 on which the original 1 is placed, such that the light source 3 and first mirror 4 can be reciprocated along the table 2. A second mirror 5 whereby the light reflected on the first mirror 4 is further refracted is disposed such that the second mirror 5 can be reciprocated at a speed $\frac{1}{2}$ time that of the first mirror in the same direction in which the first mirror is moved. An optical system 8 on the copying side having an image forming lens 7 whereby the light reflected on the second mirror 5 is formed into a life size image on a photosensitive material 6, and an optical system 11 on the transmitting side having a reading lens 10 whereby the light reflected on the second mirror 5 is formed into a reduced image on a solid scanning element 9 are disposed adjacent to each other with respect to an auxiliary scanning direction (a direction in which the light source 3 and first mirror 4 are moved).

Figure 2:
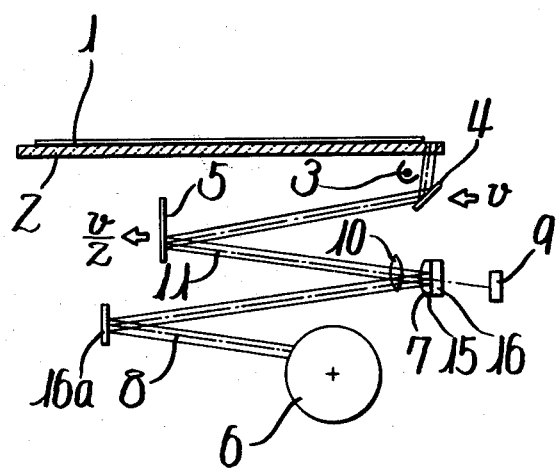
FIG. 2 is a front elevational view in longitudinal cross section of another conventional transmitting and copying machine.
Figure 3:
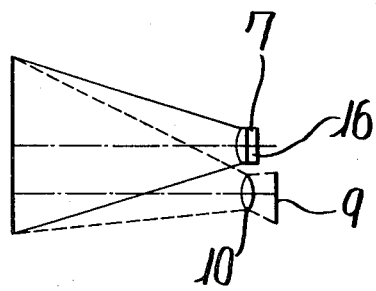
FIG. 3 is a plan view of an optical system in the transmitting and copying machine shown in FIG. 2.

In such a structure, however, light passages in the optical systems 8, 11 are different and the area of the second mirror 5 must be increased. When these light passages are brought close to each other, the image forming lens 7 and reading lens 10 must be brought very close to each other. This causes difficulty in regulating the image forming lens 7, reading lens 10 and solid scanning element 9. Moreover, the photosensitive material 6 is actually disposed at the back of the image forming lens 7 and a scanning light passage is extended in front of the image forming lens 7. Then, it becomes difficult to install the solid scanning element 9 and reading lens 10 in the optical system 11. There is another conventional transmitting and copying machine as shown in FIG. 2, in which a ready-made scanning optical system to be installed does not need to be modified. In this machine, the axis of an optical system 8 on the copying side and that of an optical system 11 on the transmitting side are biased in a main scanning direction (a direction of the width of an original 1). However, in order to prevent the light passage in the optical system 11 from being superposed on that in the optical system 8, an irregular light passage as shown in FIG. 3 has to be provided, or an image of an original has to be cross-read. In such an optical system, a reading lens 10 of an extremely large image angle is required.

The rays shown in the drawings after FIG. 3 are envelope curves of effective image forming light.

Figure 4:
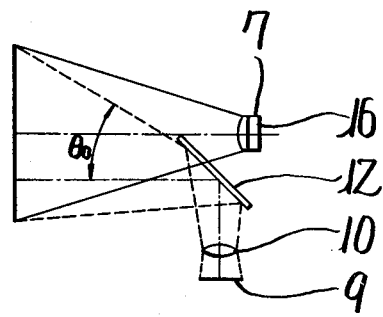
FIG. 4 is a plan view of another optical system in a conventional transmitting and copying machine.
Figure 5:
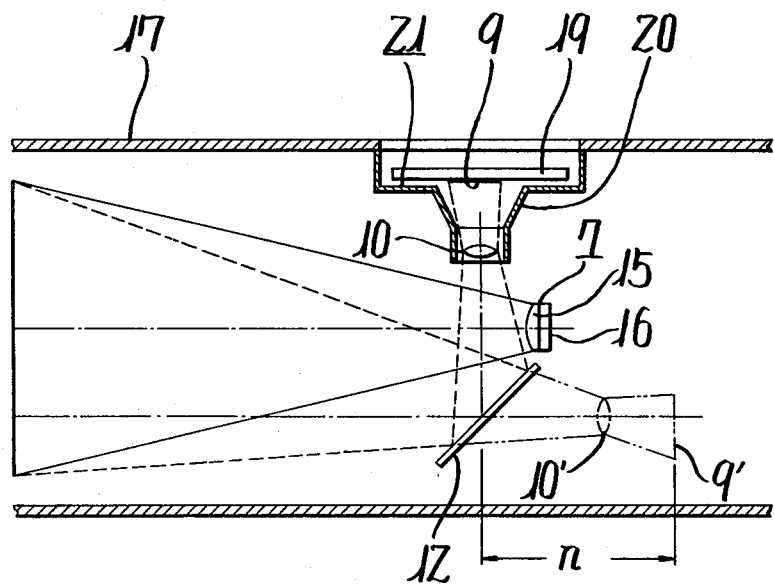
FIG. 5 is a plan view of a first embodiment of the present invention.
Figure 6:
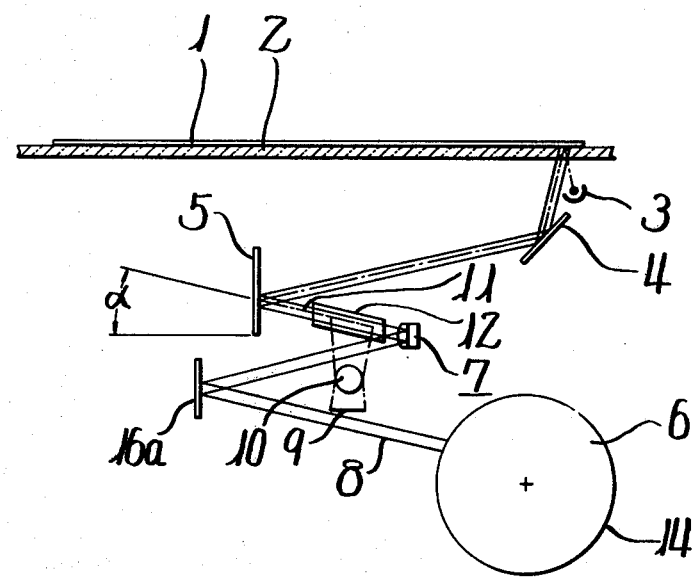
FIG. 6 is a front elevational view in longitudinal cross section of the embodiment shown in FIG. 5.
Figure 7:
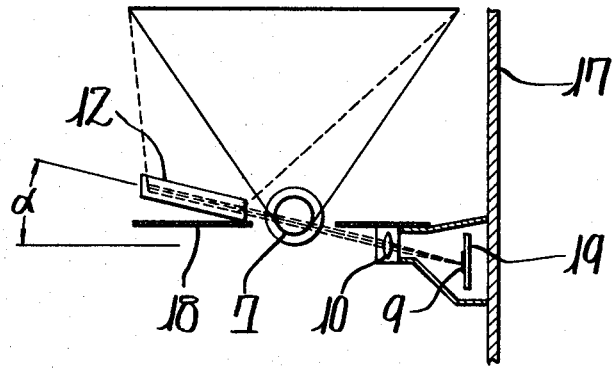
FIG. 7 is a side elevational view of the embodiment shown in FIG. 5.

There is another conventional optical system as shown in FIG. 4, which is provided with a fixed mirror 12, and a reading lens 10 and a solid scanning element 9 on the cross-reading side. In this case, however, the reflecting surface of the fixed mirror 12 and a maximum half image angle $\theta°$ of the reading lens 10 must be large.

Now, a first embodiment of the present invention will be described with reference to FIGS. 5–11. In the description, the same parts as shown in FIGS. 1–4 will be designated by the same reference numerals and the description thereof will be omitted.

An optical system 8 on the copying side is formed, which has an optical axis $\phi_1$ formed by the axes of a surface 13 of an original 1 and a photosensitive surface 14 of a photosensitive material 6. An image forming lens 7 is disposed in the central point of the optical axis $\phi_1$. The image forming lens 7 is an in-mirror type life size image forming lens, which consists of a lens 15 and a mirror 16. A fixed mirror 16a is disposed between the image forming lens 7 and photosensitive material 6. An optical axis $\phi_2$ of an optical system 11 on the transmitting side is provided such that the axis $\phi_2$ is biased by a length l in a main scanning direction (a direction of the width of the surface 13 of original 1) with respect to the original 1. A solid scanning element 9 and a reading lens 10 are tentatively disposed on the optical axis $\phi_2$, and a fixed mirror 12 is disposed, as it is inclined at 45°, between the reading lens 10 and a second mirror 5 and in the vicinity of the image forming lens 7. The fixed mirror 12 causes the optical axis $\phi_2$ to pass in front of the image forming lens 7 so as to be bent at 90° toward a side plate 17. The solid scanning element 9 and reading lens 10 are disposed on the optical axis $\phi_2$ bent by the fixed mirror 12. The focal distance of the reading lens 10 is set such that a passage n of the light reflected on the fixed mirror 12 and extending up to the surface of the solid scanning element 9 almost reaches the vicinity of the side plate 17 of a copying machine body. Assuming that an image angle of the image forming lens 7 in this surface is $\alpha$ as shown in a side elevational view in FIG. 6, an image angle of the reading lens 10 is also set at $\alpha$ (FIG. 7) so that a scanning system consisting of the first and second mirrors 4, 5 are used in common. As shown in a side elevational view in FIG. 7, the light reflected on the fixed mirror 12 advances diagonally and downwardly through an opening, which is immediately before the image forming lens 7, of a sheltering plate 7, whereby the light advancing from the optical system 8 on the copying side into the image forming lens 7 and the light outgoing from the image forming lens 7 are separated from each other, and enters the reading lens 10 perpendicularly provided in the side plate 17.

Figure 8:
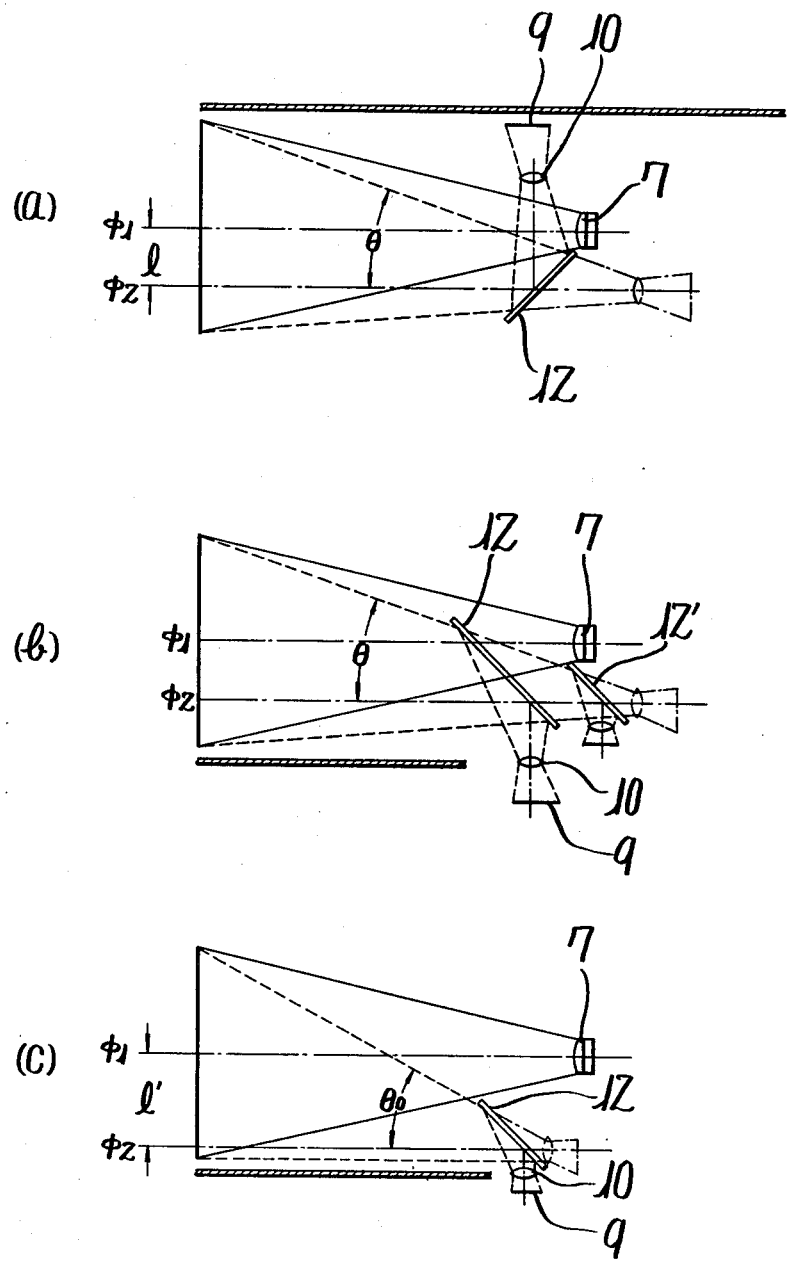
FIG. 8 is a plan view of an optical system in the embodiment shown in FIG. 5.

In a light passage formed in the above-described manner, a maximum half image angle $\theta$ of the reading lens 10 can be minimized and a lens of an extremely large image angle is not required. In addition, the length of a reflecting surface of the fixed mirror 12 can be minimized. This may be clearly understood from FIG. 8 in which an optical system in the first embodiment of the present invention is illustrated in contrast to that in a transmitting and copying machine shown in FIG. 4. FIG. 8a illustrates an optical system in the embodiment of the present invention shown in FIG. 5, while FIG. 8b illustrates an optical system in a conventional transmitting and copying machine. The optical systems shown in FIGS. 8a, 8b are identical when the optical system 11 on the transmitting side is operated without the fixed mirror 12. However, in the optical system shown in FIG. 8b, the reflecting surface of the fixed mirror 12 is long and projected into the optical system 8 on the copying side. In order to shorten the reflecting surface of the fixed mirror 12, the mirror may be moved a little back to a position 12' as shown in FIG. 8b but it may then be collided with a photosensitive material 6. Then, this is not practical. In order to prevent the fixed mirror 12 from being projected into the optical system 8 on the copying side, it is necessary that the length l of an optical axis $\phi_2$ of the optical system 11 on the transmitting side be changed to l' with respect to an optical axis $\phi_1$ (l'>l) as shown in FIG. 8c. After all, a maximum half image angle $\theta$· is greater than that $\theta$ in the present invention. Consequently, a reading lens 10 of a large image angle is required or an ordinary reading lens 10 cannot be applied. In other words, a reading lens 10 of a special design has to be used. When a light passage is set as in the optical system according to the present invention, a maximum half image angle $\theta$ of a reading lens 11 and the length of reflecting surface of a fixed mirror 12 can be minimized.

Figure 9:
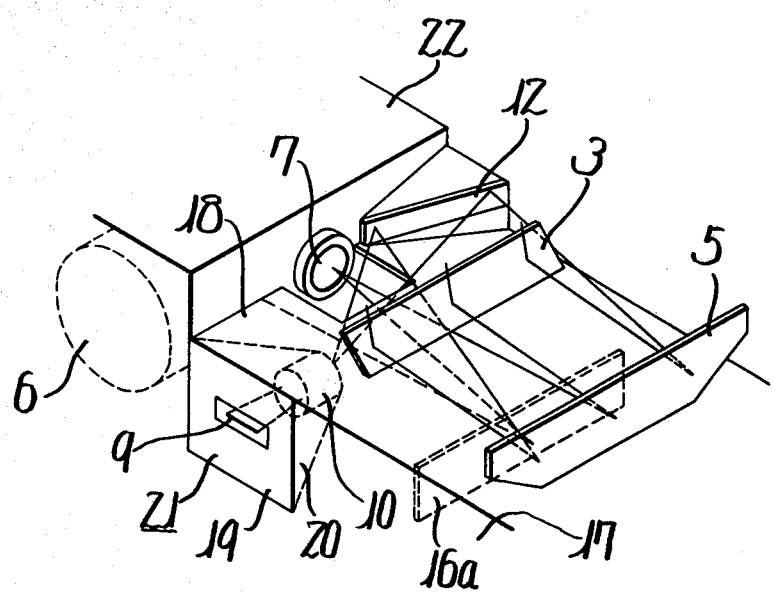
FIG. 9 is a perspective view of the optical system in the embodiment shown in FIG. 5.

The light passage can be selectively set by a sensor board unit 19 consisting of a solid scanning element 9 and a reading lens 10 and a lens CCD unit 21 consisting of a lens holder unit 20, which are detachably provided on a side plate 17 as shown in FIG. 9. The lens CCD unit 21 may be directly mounted on the side plate 17, and it may be integrally formed with an optical housing 22 to maintain the precision of optical measurements. Since the optical axis $\phi_2$ of the reading lens 10 is kept perpendicular with respect to the side plate 17, the light passage can be easily set even when the reading lens 10, solid scanning element 9 and sensor board unit 19 are formed separately. In any case, the optical and electric systems can be controlled at a side portion of the machine. In addition, the surface of a copied image is never affected by flaring light since the light reflected on the fixed mirror 12 advances downwardly through the opening in the sheltering plate 18.

Figure 10:
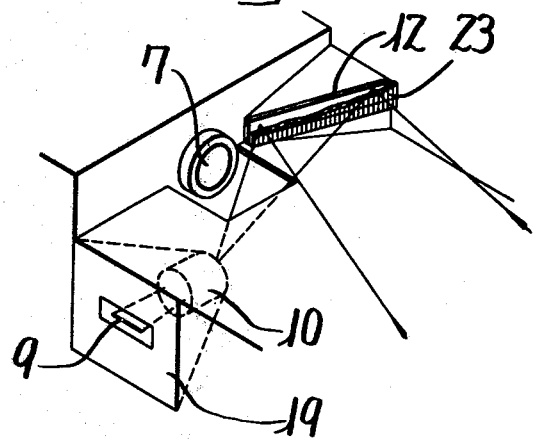
FIG. 10 is a perspective view of the same optical system shown in FIG. 9 with a shading correction plate disposed immediately before a fixed mirror.
Figure 11:
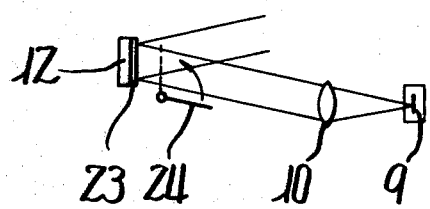
FIG. 11 is a side elevational view of the optical system shown in FIG. 9 with a shutter provided therein.

The spectral sensitivity of the photosensitive material 6 is not always the same as that of the solid scanning element 9. Thus, the fixed mirror 12 may be used as an interference mirror while suitably regulating the spectral reflection factor thereof in accordance with the spectral sensitivity of the solid scanning element 9, to control the photosensitivities of both of them to suitable levels. A part to be read is asymmetrically disposed with respect to the optical axis $\phi_2$ of the reading lens 10 and, consequently, an asymmetrical shading correction is required. In order to conduct an asymmetrical shading correction, it may be necessary to provide a shading correction plate 23 immediately before the fixed mirror 12 as shown in FIG. 10. Such a shading correction can be carried out by not only the shading correction plate 23 but also an electric means. In order to perfectly prevent stray light from occurring during a copying operation, a shutter 24 may be provided in front of the fixed mirror 12 as shown in FIG. 11. This shutter 24 may be omitted when a copied image is not affected by stray light.

A printer, such as CRT (not shown) may be inserted as a copying means in this kind of machine so that the machine permits both the recording of a copied image, which can be effected by a conventional machine as well, and the recording of a digital image. The insertion of such a printer also allows an electrical exchange of information between a plurality of the same type of machines. When the CCD unit 22 is omitted, this machine can be used in the same manner as a conventional copying machine, or the machine may have another function as necessary.

Figure 12:
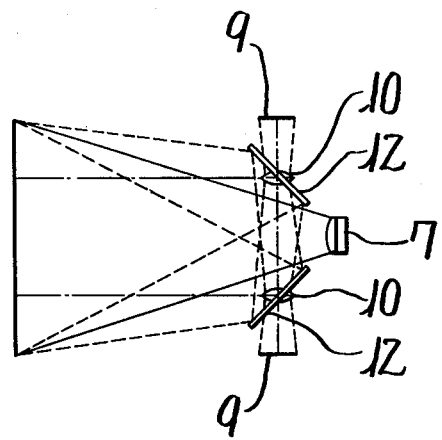
FIG. 12 is a plan view of a second embodiment of the present invention.
Figure 13:
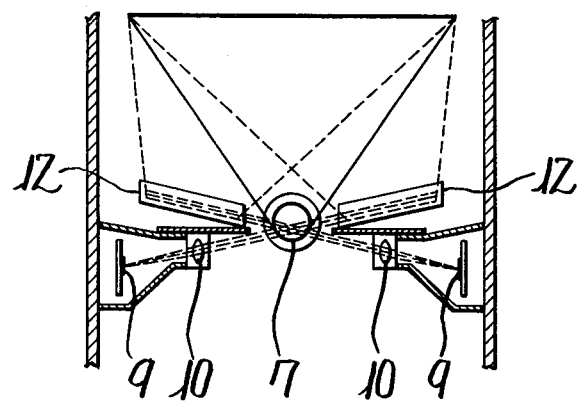
FIG. 13 is a side elevational view in longitudinal cross section of the embodiment shown in FIG. 12.

FIGS. 12 and 13 show a second embodiment of the present invention, in which the transmitting and scanning of a surface 13 of an original divided into two is carried out by two sets of symmetrically disposed optical systems 11 on the transmitting side. In this arrangement, the density of main scanning lines with respect to the same main scanning width is doubled. When the density of main scanning lines are the same, the main scanning width can be doubled.

The transmitting and copying machine according to the present invention is provided as mentioned above with a fixed mirror whereby the optical axis of an optical system on the transmitting side, which is biased with respect to that of an optical system on the copying side, is bent as it passes in front of an image forming lens; and a reading lens and a solid scanning element on the optical axis thus bent. Therefore, a maximum half image angle of the reading lens and the reflecting surface of the fixed mirror can be minimized. In addition, the optical system on the transmitting side can be practiceably inserted without modifying the optical system on the copying side and the neighbouring parts.

I claim:

1. A transmitting and copying machine comprising a light source for illuminating an original held on a table and a first mirror for refracting the light reflected on said original, which are reciprocatably disposed under said table; a second mirror capable of refracting the light from said first mirror and reciprocatable in the same directions as said first mirror at a speed ½ time as that of said first mirror; an optical system on the copying side having an image forming lens for guiding the light reflected on said second mirror to a photosensitive material to form an image thereon; an optical system on the transmitting side having a reading lens for guiding the light reflected on said second mirror to a solid scanning element to form a reduced image thereon; and a fixed mirror for bending the optical axis of said optical system on the transmitting side such that the optical axis passes in front of said image forming lens, the optical axes of said optical systems on the copying and transmitting sides being biased in a main scanning direction, said reading lens and said solid scanning element being disposed on said bent optical axis of said optical system on the transmitting side.

2. A transmitting and copying machine according to claim 1, wherein a CCD unit consisting of an integrally formed combination of a sensor board unit having said solid scanning element and a lens holder unit having said reading lens is detachably mounted on a side plate of a housing for said optical systems.

3. A transmitting and copying machine according to claim 1, wherein a sheltering plate is disposed parallel to the surface of said original as they are spaced from each other by a predetermined distance, said fixed mirror being disposed on the original-side of said sheltering plate, said sheltering plate having an opening in the portion thereof which is immediately before said image forming lens, said opening serving to separate the light entering said image forming lens in said optical system on the copying side from the light outgoing from said image forming lens, said reading lens in said optical system on the transmitting side being disposed on the other side of said sheltering plate to allow the light from said fixed mirror to said reading mirror to be passed through said opening.

4. A transmitting and copying machine according to claim 1, wherein the spectral reflection factor of said fixed mirror is set in accordance with the spectral sensitivity of said solid scanning element.

5. A transmitting and copying machine according to claim 1, wherein a shading correction plate is disposed immediately before said fixed mirror.

6. A transmitting and copying machine according to claim 1, wherein a stray light preventing shutter is movably disposed immediately before said fixed mirror.

7. A transmitting and copying machine comprising a light source for illuminating an original held on a table and a first mirror for refracting the light reflected on said original, which are reciprocatably disposed under said table; a second mirror capable of refracting the light from said first mirror and reciprocatable in the same directions as said first mirror at a speed ½ time as that of said first mirror; an optical system on the copying side having an image forming lens for guiding the light reflected on said second mirror to a photosensitive material to form an image thereon; an optical system on the transmitting side having a reading lens for guiding the light reflected on said second mirror to a solid scanning element to form a reduced image thereon; and a pair of fixed mirrors bending the optical axes of said optical system on the transmitting side such that the optical axis passes in front of said image forming lens while dividing the surface of said original into two, the optical axis of said optical system on the copying side and two optical axes of said optical system on the transmitting side which include said optical axis of said optical system on the copying side being biased in a main scanning direction, said reading lens and said solid scanning element being disposed in symmetrical positions on said bent optical axes.

* * * * *